Patented Feb. 10, 1942

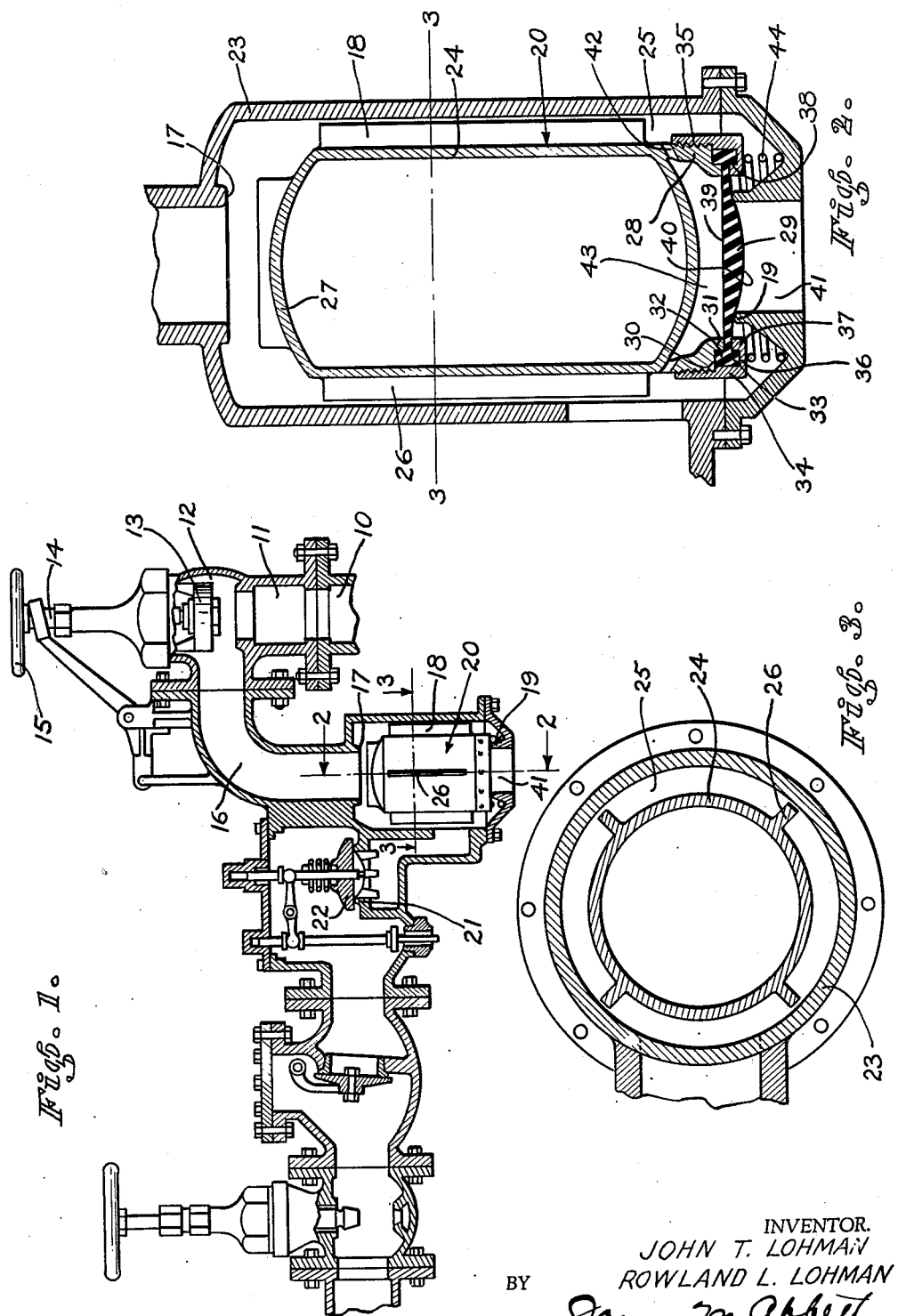

2,272,304

UNITED STATES PATENT OFFICE 2,272,304

ANTISIPHON VALVE

John T. Lohman, Los Angeles, and Rowland L. Lohman, North Hollywood, Calif., assignors to Lohman Bros., Los Angeles, Calif., a corporation of California Application September 30, 1940, Serial No. 358,948

7 Claims. (Cl. 137—104)

This invention relates to plumbing equipment, and particularly pertains to an anti-siphon valve.

At the present time the plumbing industry and departments of public health have become aware of the fact that it is imperative that means be provided to prevent contamination of water supply from sources to which the clean water is delivered normally. This contamination usually takes place when conditions arise causing a backflow or back-siphonage of water from service lines to a supply line. An attempt has been made to correct this condition by the use of an anti-siphon valve which is normally closed and which will open under back-siphonage conditions. Valves of this type have been objectionable in that often they remain normally set for a considerable period of time, which causes the valve element to become set to the valve seat, whereby it will not respond to back-siphonage action and move out of its seat. It is the principal object of the present invention, therefore, to provide a valve structure disposed in the flow stream of liquid from a supply line to a service line, or at any other position where anti-siphon action is liable to occur, which valve is so constructed as to be maintained free from adherence to the valve seat, and is so designed as to instantly move from the valve seat under anti-siphonage conditions or a zero or very low pressure.

The present invention contemplates the provision of a valve housing adapted to be interposed in the flow line between a water supply main and a service line, or either of said lines separately, which housing includes a well within which a float valve is positioned, the float valve carrying a non-metallic sealing member normally resting upon a valve seat, the valve being further constructed to cause pulsation of the non-metallic sealing member while resting on the valve seat, whereby the possibility of "freezing" the valve to the seat will be eliminated.

The invention is illustrated by way of example in the accompanying drawing, in which:

Figure 1 is a view in central vertical section showing the application of the present invention.

Fig. 2 is an enlarged view in transverse section through the structure as seen on the line 2—2 of Fig. 1, indicating the relative position of the parts in the device.

Fig. 3 is a view in transverse section as seen on the line 3—3 of Fig. 2.

The present invention is designed to be used in connection with various pieces of plumbing equipment, such for example as the valve structure shown in the application of John T. Lohman and Rowland L. Lohman, entitled "Method and means of preventing backflow in plumbing systems," filed in the United States Patent Office April 26, 1940, Serial No. 331,800. In such a structure the water supply main 10 is provided and connected to the vertical leg 11 of the shut-off valve housing 12, said housing enclosing a valve element 13. This valve element is operated by any suitable means, such for example as the valve rod 14 carrying a hand wheel 15. A water leg 16 is connected to the housing 12 and conducts water from the housing and downwardly through a valve seat 17. The opening through this seat communicates with a valve chamber 18, at the bottom of which is disposed a valve seat 19. This seat has a central opening through it in axial alignment with the central opening through the valve seat 17 and communicates with the atmosphere. Due to this arrangement a vertically moving valve element 20 may seat against the valve seat 17 to prevent ingress of water from the supply main while establishing communication between valve chamber 18 and the atmosphere through the valve seat 19. When the valve element 20 is moved to its lower position the valve seat 19 will be closed and ingress of water from the supply main 10 may be established to and through the valve chamber 18. In the structure shown in Fig. 1 of the drawing the valve chamber communicates with a valve seat 21 through which water may flow when a valve element 22 is raised. It is to be understood, however, that other types of installation might be provided in which the valve 20 will operate appropriately. The valve 20 in the present installation is an anti-siphon valve. This valve is normally seated on the valve seat 19 and is opened when a predetermined backflow pressure condition exists. It will be evident, therefore, that since the valve 20 is maintained on the seat 19 at all times save when an emergency arises that there is a tendency for the valve to become stuck to the seat. This will defeat the purpose for which the valve is provided and the details of construction of the valve 20 have been designed to prevent cohesion of the valve to its seat and to insure that the valve will move freely therefrom when desired.

Referring more particularly to Figs. 2 and 3 of the drawing, it will be seen that the valve chamber 18 is enclosed within a housing 23. This housing is substantially cylindrical and is formed with a valve seat 17 at its upper end and a valve seat 19 at its lower end. Disposed within the housing is the valve element 20. This element includes a hollow cylindrical float 24 which is of a diameter sufficiently less than the inside diameter of the housing to create a flow space 25. The cylindrical shell 24 is formed with longitudinal fins 26 which tend to center the valve unit 20 within the housing while permitting it to move vertically. The upper end of the shell 24 is formed with a convexed head 27 which may move upwardly and seat against the valve seat 17 to prevent the inflow of liquid to the water leg 16. At the lower end of the shell 24 is a cylindrical extension 28. This extension is formed with a seat at its lower end to receive a valve diaphragm 29. The seat has an outer flat annular shoulder 30 extending around the extension, from which shoulder an inner annular lip 31 projects. The valve diaphragm 29 is a circular member having an upwardly projecting marginal flange 32 which circumscribes the lip 31 and rests against the shoulder 30. A lower annular flange 33 extends downwardly and is engaged by a clamping sleeve 34. This sleeve is threaded onto the threads 35 of the extension 28. The sleeve has an inturned flange 36 which rests against the bottom face of the member 33 and an upturned annular lip 37 which engages a shoulder 38. The central portion of the valve diaphragm 29 has an upper flat face 39 which is in the plane of the ends of the members 31. The lower face of the valve diaphragm 29, as indicated at 40, is convexed. The convexed portion extends into the opening 41 through the valve seat 19 when the valve is seated.

It is to be understood that the valve diaphragm 29 is preferably made of rubber and that the outside diameter of the lip of the valve seat 19 is materially less than the inside diameter of the extension portion 31 of the shell 24 and the lip 37 on the sleeve 34. This provides an area around the upwardly projecting annular valve seat 19, where the valve diaphragm is its thinnest and where freedom of flexibility of the diaphragm exists. By this arrangement it also is provided that the portion of the diaphragm projecting into the valve opening 41 will increase in thickness progressively toward the center of the diaphragm; thus, action to produce flexing of the diaphragm will be greater at the margin of the diaphragm and over the lip of the valve seat 19 than in the center of the diaphragm. For the purpose of increasing the flexing action of the diaphragm under conditions to be hereinafter set forth fluid vents 42 are formed through the wall of the extension 28 of the shell 24 and communicate with a cushion chamber 43. Interposed between the lower end of the valve unit 20 and the portion of the housing surrounding the valve seat 19 is a coil spring 44 which resists downward movement of the valve element 20 yieldably and will tend to break the seal between the diaphragm 29 and the valve seat 19 when fluid pressure within the water leg 16 is near or less than atmospheric pressure.

In operation of the present invention, when it is desired to use the valve structure 20 for the purpose shown in Fig. 1 of the drawing the valve unit is made with its shell 24 hermetically sealed so that the shell will be buoyant. Liquid under pressure flows into the valve chamber 18 from the water leg 16 and due to the area of the end 27 of the valve will force the valve unit 20 downwardly to force the valve diaphragm 29 onto the valve seat 19. At this time the chamber 18 will be filled with the liquid and this liquid will also fill the cushion chamber 43 by passing through the openings 42 at the bottom of the valve element 20. It will be recognized that whenever liquid is drawn from the chamber 18 and through a service line system that there will be a temporary surge in pressure of the liquid. This surge will cause the valve unit 20 to pulsate since it is being flexibly supported by the valve diaphragm 29 and the spring 44. The pressure variation, however, will not be sufficient to move the diaphragm 29 entirely from contact with the seat 19. The action, however, will tend to repeatedly flex the diaphragm 29 over the edge of the valve seat 19 and will prevent any tendency of the diaphragm to adhere to the valve seat. It will also be understood that it is common for a pressure difference to exist in water supply mains during each 24-hour period. This difference may be as much as 12 pounds. This pressure difference will also act to vary the flexing of the diaphragm valve 29, both by reason of the pressure exerted upon the valve shell 24 and the pressure exerted by the fluid which passes in through the openings 42 and into the pressure chamber 39 above the diaphragm valve 29.

It is to be understood that while the valve structure is here shown as being disposed with its longitudinal axis vertically that the structure will operate when otherwise positioned, if desired.

It will thus be seen that by the means here shown a valve structure is provided which will act automatically to close and seal when a predetermined pressure is created in a fluid supply line, and which structure is further designed to insure that variation in pressure of the fluid, or pulsation and pressure, will tend to create a movement of the valve element with relation to its seat, thereby maintaining the valve element free on the seat so that it will not stick to the seat or become "frozen" thereagainst.

It will thus be seen that the valve structure here disclosed provides simple and effective means for closing a valve opening, said structure being designed to be particularly responsive to variation in fluid pressure and involving the use of a valve element which will not become permanently fastened to the valve seat in a closing position.

While we have shown the preferred form of our invention as now known to us, it will be understood that various changes may be made in combination, construction and arrangement of parts by those skilled in the art, without departing from the spirit of our invention as claimed.

Having thus described our invention, what we claim and desire to secure by Letters Patent is:

1. A valve structure comprising a housing having an outlet opening at the bottom thereof and an inlet opening at a point thereabove, said outlet opening being formed with an upwardly protruding annular valve seat lip, a floating valve unit thereabove comprising a float chamber, a valve diaphragm carried on the lower end of said float chamber adapted to be moved to a sealing position upon the valve lip, said valve diaphragm being of a diameter sufficiently greater than the outer diameter of the valve lip whereby a flexible area of the diaphragm will extend beyond the valve lip, and means for rigidly securing the marginal edge of said diaphragm to the float whereby it will maintain the diaphragm taut when seated over the valve lip.

2. A valve structure comprising a housing having an opening in its lower end circumscribed by an upwardly protruding valve seat lip lying in a horizontal plane, the housing being further provided with a liquid inlet opening whereby the housing may fill with liquid when the valve is seated, a floating valve unit mounted within the housing, said valve unit including a buoyant member, a valve diaphragm carried by the buoyant member and adapted to be moved therewith toward and away from seated position against the annular protruding valve lip, said diaphragm being flexible and being of a diameter materially greater than the outer diameter of the annular protruding lip whereby an annular free area of the diaphragm will occur around and beyond the protruding lip, and means gripping the marginal edge of the diaphragm and securing it to the buoyant member to hold the diaphragm taut and to permit it to flex over the valve lip as pressure is exerted to move the buoyant member downwardly.

3. A valve structure comprising a housing having an opening in its lower end circumscribed by an upwardly protruding valve seat lip lying in a horizontal plane, the housing being further provided with a liquid inlet opening whereby the housing may fill with liquid when the valve is seated, a floating valve unit mounted within the housing, said valve unit including a buoyant member, a valve diaphragm carried by the buoyant member and adapted to be moved therewith toward and away from seated position against the annular protruding valve lip, said diaphragm being flexible and being of a diameter materially greater than the outer diameter of the annular protruding lip whereby an annular free area of the diaphragm will occur around and beyond the protruding lip, means gripping the marginal edge of the diaphragm and securing it to the buoyant member to hold the diaphragm taut and to permit it to flex over the valve lip as pressure is exerted to move the buoyant member downwardly, and means whereby fluid pressure may be exerted upon the upper side of the flexible diaphragm, tending to cause its center portion to be distended into the valve opening circumscribed by the annular lip when the valve unit is seated.

4. A valve structure comprising a housing having an opening in one of its ends circumscribed by a protruding valve seat lip lying in a transverse plane, the housing being further provided with a liquid inlet opening whereby the housing may fill with liquid when the valve is seated, a floating valve unit mounted within the housing, said valve unit including a buoyant member, a valve diaphragm carried by the buoyant member and adapted to be moved therewith toward and away from seated position against the annular protruding valve lip, said diaphragm being flexible and being of a diameter materially greater than the outer diameter of the annular protruding lip whereby an annular free area of the diaphragm will occur around and beyond the protruding lip, means gripping the marginal edge of the diaphragm and securing it to the buoyant member to hold the diaphragm taut and to permit it to flex over the valve lip as pressure is exerted to move the buoyant member, and means whereby fluid pressure may be exerted upon the side of the flexible diaphragm opposite the valve seat, tending to cause its center portion to be distended into the valve opening circumscribed by the annular lip when the valve unit is seated, said diaphragm being thicker toward the center.

5. A valve structure comprising a cylindrical housing, a liquid inlet opening therein, a liquid outlet opening in the wall thereof, an opening to atmosphere in the housing, a protruding annular valve seat circumscribing said opening to atmosphere, a valve element mounted within the housing and comprising a cylindrical float of a diameter sufficiently less than the inside diameter of the housing to provide a passage for liquid therearound, means guiding said float so that it may move vertically in said housing and be maintained centrally thereof, a flexible valve diaphragm carried at the end of the float and secured by its marginal edge in a stretched position across the end of said float and spaced therefrom so that it would be free to flex when resting upon the annular valve seat to close the same, and spring means interposed between the valve unit and the valve housing tending to urge the valve diaphragm from the seat.

6. A valve structure comprising a housing into which a fluid may flow, a valve opening in said housing, the opening being circumscribed by an inwardly protruding lip, a valve element adapted to move toward and away from said lip, a flexible diaphragm of larger diameter than the lip and secured in a stretched position by its marginal edge to said element to close said opening, and a pressure chamber within the valve element and in the rear of the diaphragm, said pressure chamber communicating with the interior of the housing whereby fluid within the housing may exert a pressure upon the rear of the diaphragm tending to flex it into the valve opening and over and around the valve lip.

7. A valve structure comprising a housing into which a fluid may flow, a valve opening in said housing, the opening being circumscribed by an inwardly protruding lip, a valve element adapted to move toward and away from said lip, a flexible diaphragm of larger diameter than the lip and secured in a stretched position by its marginal edge to said element to close said opening, and a pressure chamber within the valve element and in the rear of the diaphragm, said pressure chamber communicating with the interior of the housing whereby fluid within the housing may exert a pressure upon the rear of the diaphragm tending to flex it into the valve opening and over and around the valve lip, said valve element being freely movable within the housing and being moved to its seat by the pressure of the fluid passing through the housing.

JOHN T. LOHMAN.
ROWLAND L. LOHMAN.